Sept. 3, 1940.　　　　　F. A. BERG　　　　　2,213,664
AUTOMATIC CHANGE-OVER FOR FILMS
Filed Aug. 30, 1938　　　5 Sheets-Sheet 1
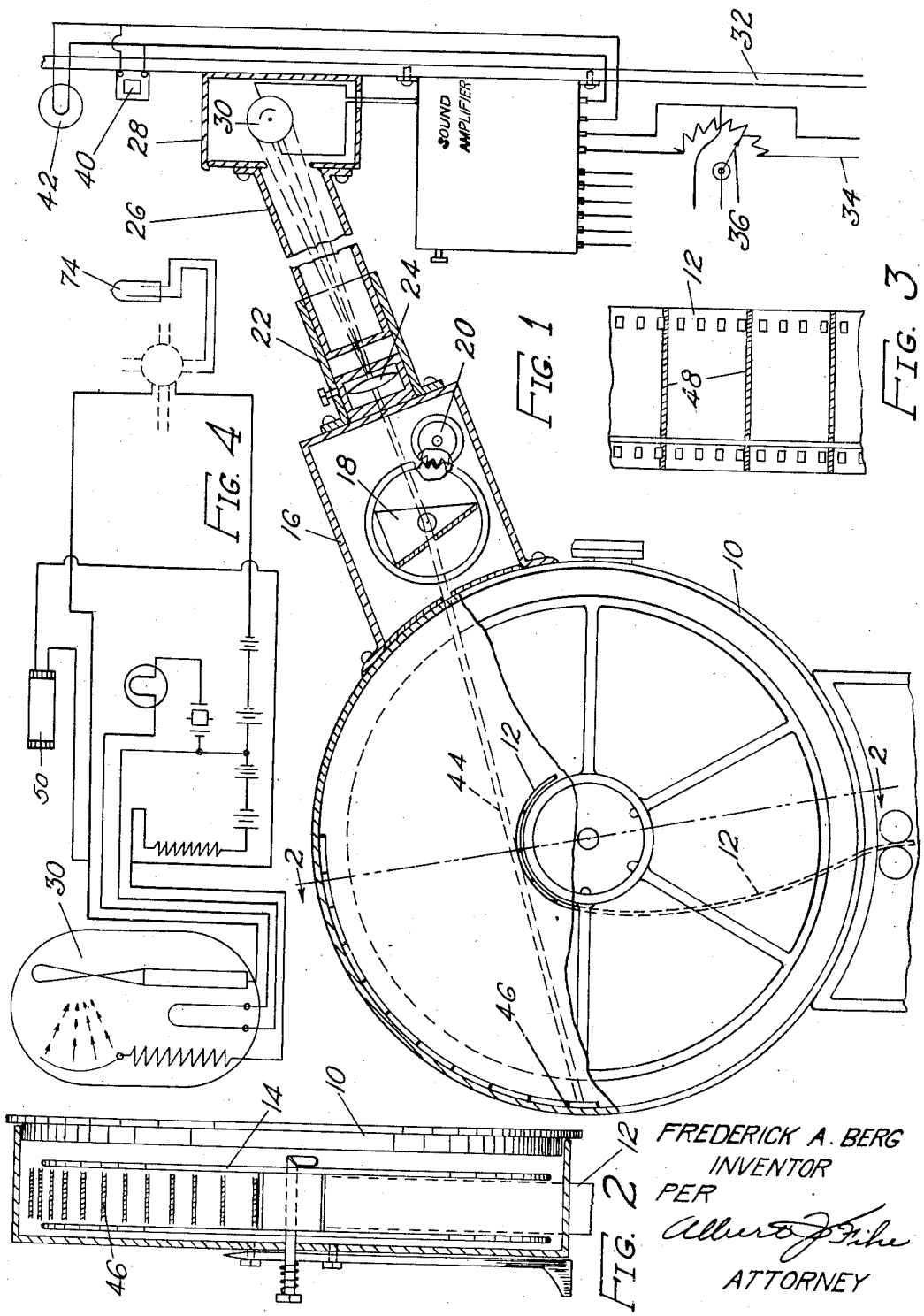
FREDERICK A. BERG
INVENTOR
PER
ATTORNEY Sept. 3, 1940. F. A. BERG 2,213,664
AUTOMATIC CHANGE-OVER FOR FILMS
Filed Aug. 30, 1938 5 Sheets-Sheet 2
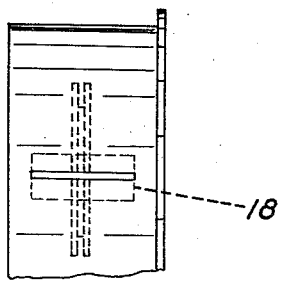
FIG. 9
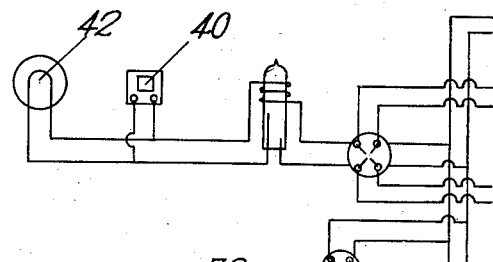
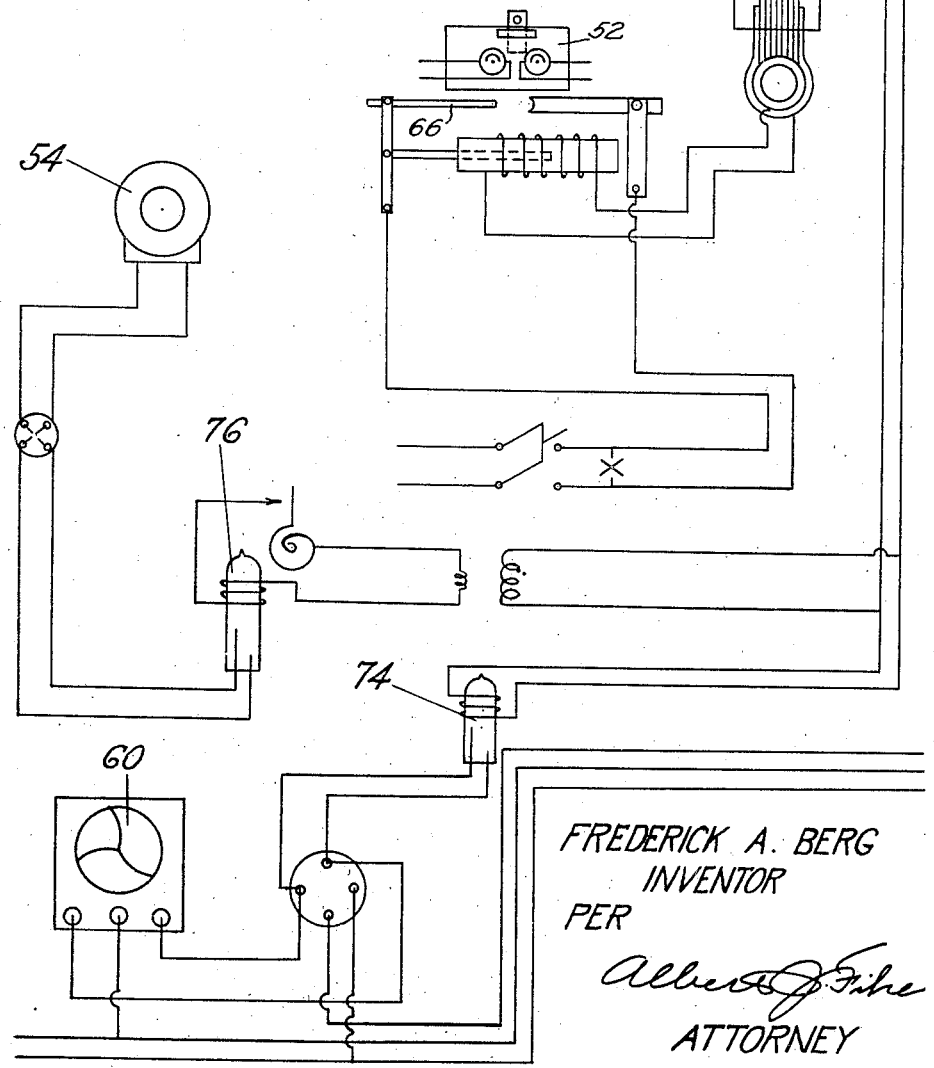
FIG. 5
FREDERICK A. BERG
INVENTOR
PER
Albert J. Fihe
ATTORNEY Sept. 3, 1940.　　　　　F. A. BERG　　　　　2,213,664
AUTOMATIC CHANGE-OVER FOR FILMS
Filed Aug. 30, 1938　　　5 Sheets-Sheet 5

INPUT TO
SOUND AMPLIFIER

FREDERICK A. BERG
INVENTOR
PER
ATTORNEY

Patented Sept. 3, 1940

2,213,664

UNITED STATES PATENT OFFICE 2,213,664

AUTOMATIC CHANGE-OVER FOR FILMS

Frederick A. Berg, Chicago, Ill.

Application August 30, 1938, Serial No. 227,517

8 Claims. (Cl. 88—16.2)

This invention relates to an improved automatic change-over for films and has, for one of its principal objects, the provision of means whereby in motion picture operation, the showing on one film will be automatically changed to another film at the proper time.

One of the important objects of this invention is the inclusion, in the usual motion picture projection apparatus such as used in theaters, of a photo-electric cell control whereby, when one film is being unwound from its reel, a certain stage in the unwinding will automatically start an adjacent or subsequently continuous film projector into operation so that the change-over from one to the other can be effected without delay and without any break in the continuity of the picture so far as the audience is concerned.

Another and still further important object of the invention is the use of a new type of material for energizing a photo-electric cell whereby a more compact and positively operating structure will result.

Other and further important objects of the invention will be apparent from the disclosures in the accompanying drawings and following specification.

The invention, in a preferred form, is illustrated in the drawings and hereinafter more fully described.

In the drawings:

Figure 1 is a detail view, partly in section of the improved film change-over apparatus of this invention showing the photo-electric cell and its connections.

Figure 2 is a sectional view taken on the line 2—2 of Figure 1.

Figure 3 is a detail view of a portion of the film employed showing the application of the novel photo-electric cell actuating means thereto.

Figure 4 is a wiring diagram of an automatic space and current control for carbon arcs to be used in projection machines.

Figure 5 is a view of a portion of the wiring diagram and associated parts involved in the construction of the automatic film change-over of my invention.

Figure 9 is a view looking through the prism into the film magazine.

As shown in the drawings:

Figure 6:
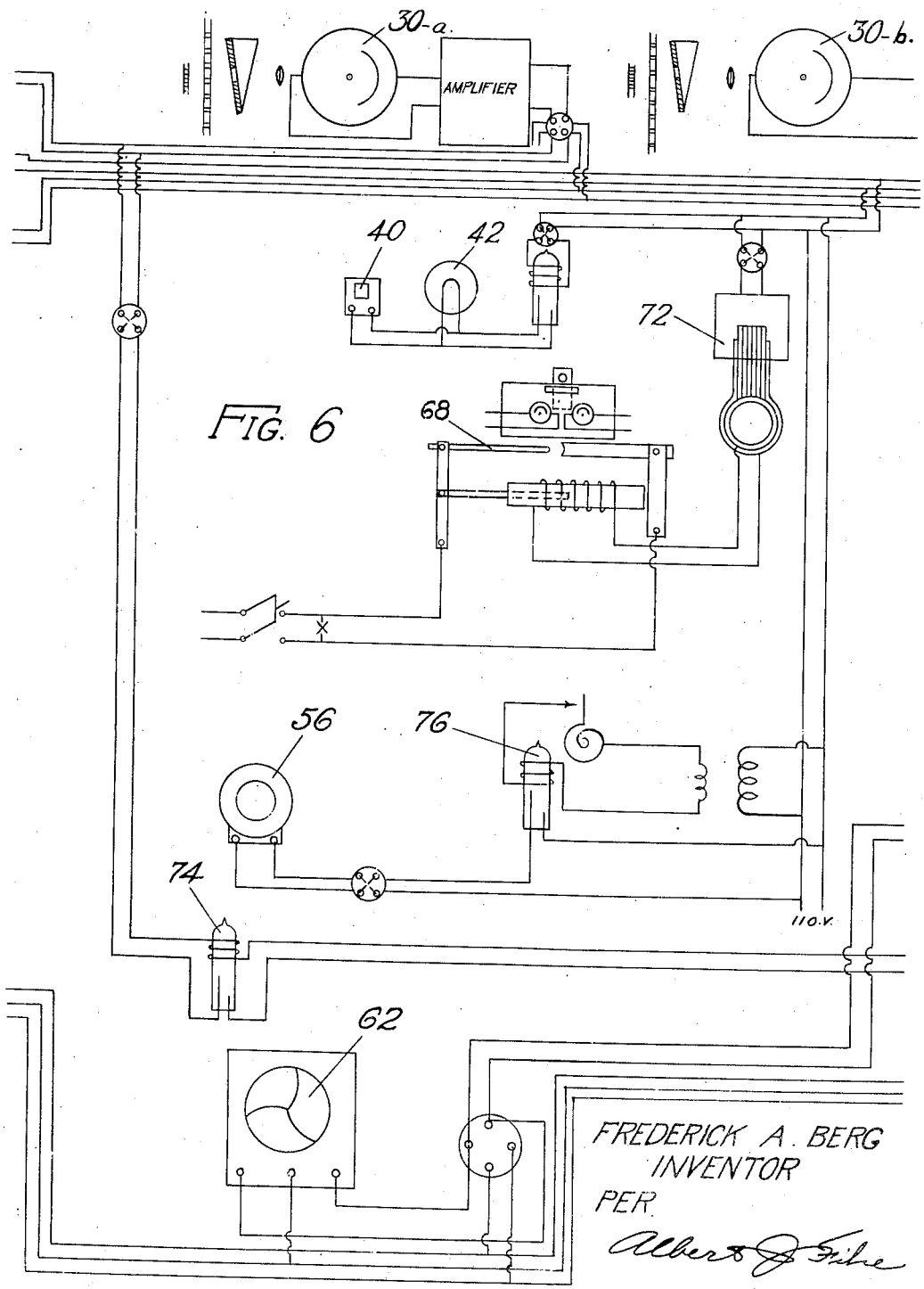
Figure 6 is a continuation of the wiring diagram shown in Figure 5.

The reference numeral 10 indicates generally the housing or casing for the film 12, the film being unwound from a reel 14 in the usual manner.

An extension in the housing 16 is mounted on the film casing 10, and in this housing is pivotally mounted a prism 18, the same being adapted to be adjusted about a central axis by means of adjustment gears 20.

Adjacent the prism housing 16 is a further extension 22 which supports a lens or lenses 24, and a telescopic extension of this portion of the apparatus extends outwardly as best shown at 26 terminating in a housing 28 in which is positioned a photo-electric cell 30. The housing for the photo-electric cell is mounted on a panel board or the like 32, and the usual electrical connections including a source of power supply 34 are provided, a potentiometer fader as shown at 36 being also included in the circuit. The photo-electric cell additionally controls the operation of a buzzer 40 and a signal light 42.

In order to actuate the photo-electric cell, light may enter the casing 10 through an opening in one end thereof, passing therefrom into the housing 16 as indicated by the dash lines 44 in Figure 1, and instead of a source of light, a series of strips of some luminous paint 46 may be applied to the opposed face of the housing as best shown in Figures 1 and 2. The prism 18 can be so adjusted that light from the radium paint or through a slit in the housing 10 will, when it just clears the face of the gradually unwinding film 12, actuate the photo-electric cell 30, thereupon setting into operation the remaining electrical elements of the improved apparatus of this invention.

If desired, the film 12 may also have painted thereon strips of luminous paint as indicated at 48 in Figure 3 whereby the uncovering of a certain portion of the film itself will tend to operate the photo-electric cell 30 with its various appurtenances.

In Figure 4, an automatic space and current control for the carbon arcs used in the projection apparatus is illustrated, this construction corresponding to that previously shown and described in my earlier Patent No. 1,959,654 granted May 22, 1934, wherein the element 50 represents a light sensitive cell as shown in my patent, Number 1,889,431, on Photo electric tube and the reference numeral 52 indicates the arc operating device shown in Figure 5. This can be employed with the arcs of the present invention.

Figure 7:
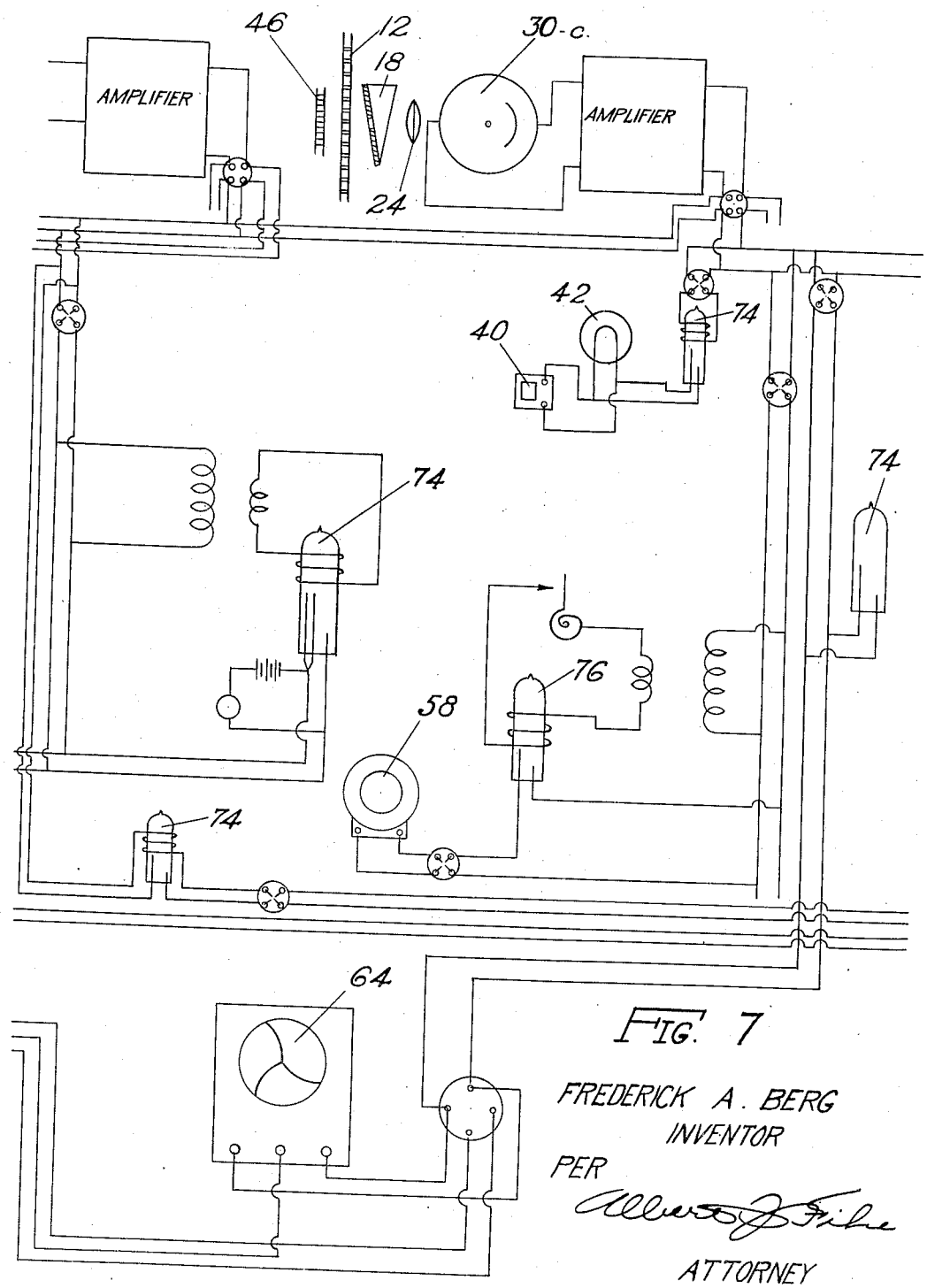
Figure 7 is a further continuation of the diagrams of Figures 5 and 6.

As best shown in Figure 5, the reference numeral 54 indicates the motor which operates one of the projectors, and in Figure 6, the reference numeral 56 indicates a further motor for another projector, and in Figure 7, the reference numeral 58 indicates a motor for a third projector. In like manner, the reference numerals 60, 62 and 64 represent respectively the film housings and spools. The arcs for the various projectors together with their controls are illustrated at 66, 68 and 70 in Figures 5, 6 and 8 respectively.

Obviously, there will be three sets of photo-electric cells shown at 30a and 30b in Figure 6 and at 30c in Figure 7. Warning buzzers and signal lights are also indicated at 40 and 42 throughout these figures.

The arcs are operated by time delay switches 72 of the mercury type such as those shown in United States Patent No. 1,967,247 issued July 24, 1934 and other time delay mercury switches such as those shown in United States Patent No. 1,967,950 issued July 24, 1934 are illustrated at 74 throughout the drawings.

Time delay switches of still a different type but similar to those shown in United States Patent No. 1,967,247 issued July 24, 1934 are illustrated at 76 throughout the drawings.

Figure 8:
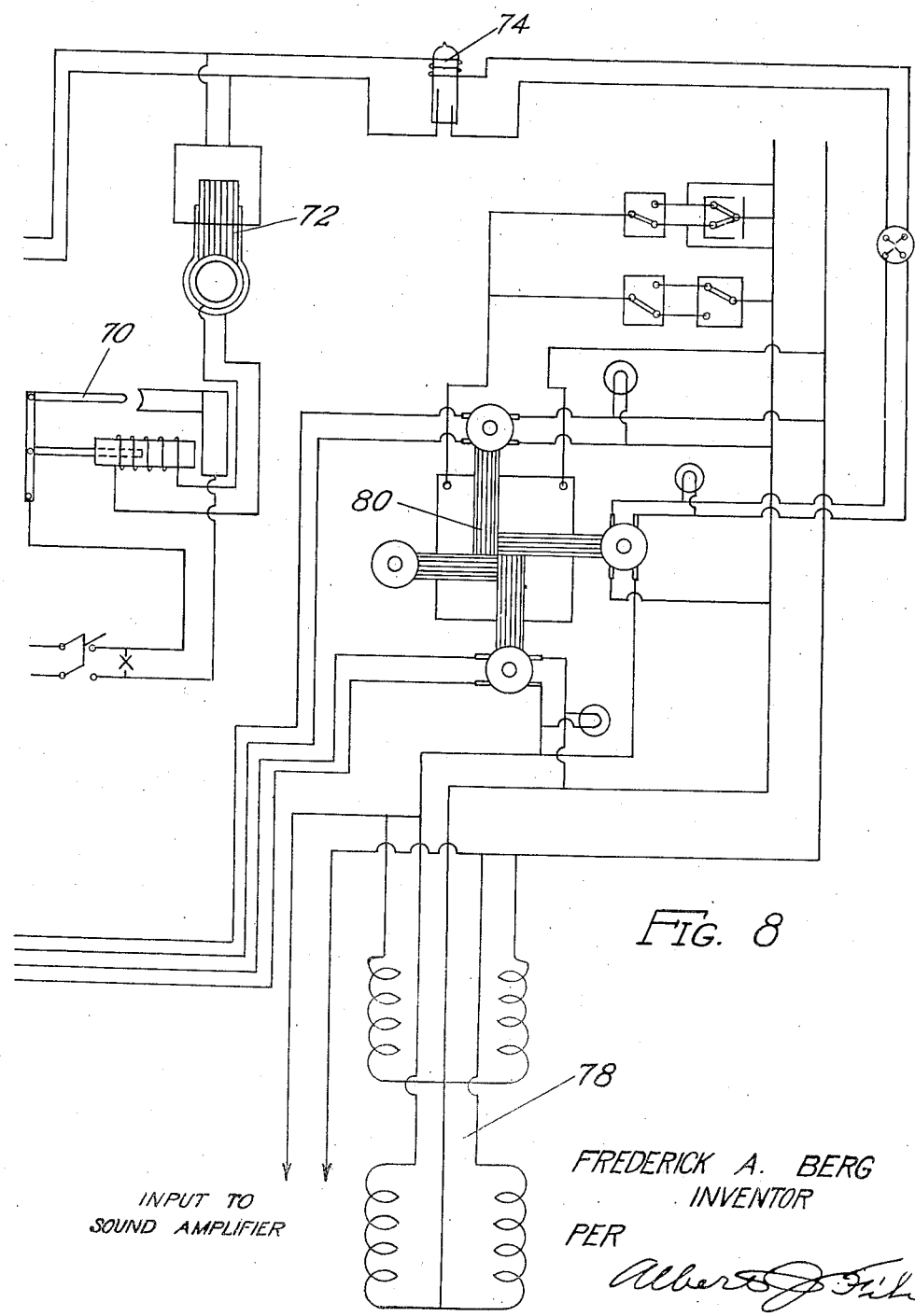
Figure 8 is a completion of the electrical circuits and wiring diagrams.

The connections of a relay fader of the short-circuiting type for the various projectors are illustrated at 78 in Figure 8, there being a still further time delay switch and appurtenances illustrated at 80 in this figure.

The remainder of the apparatus and wiring is that in the usual hook-up and construction for motion projection apparatus, the main and essential difference being that as soon as any one of the photo-electric cells 30 is actuated, it will, in addition to instigating the operation of the buzzer 40 and the signal light 42, also, through the slow-acting relays, strike a particular arc 70 which is for the next projector in line to be operated and, at the same time, begin the operation of the corresponding motor 54, 56 or 58. The potentiometer fader 36 is also operated at the proper time so that the sound control is automatically handled, particularly at the moment of change-over.

It will be seen that herein is provided a novel yet simple and effective apparatus for effecting an automatic and instantaneous change-over from one motion picture projector to another, thereby simplifying and making more positive the operation of motion picture machines of this type while, at the same time, so notifying the operator in charge that, even though the automatic apparatus does for some unknown reason fail to function, the operator can, through manual controls, take care of the necessary procedure. In fact, all that is ordinarily necessary is that the operator watch the machine to make sure it is functioning properly, even such minor details as the actual control of the spacing of the arcs during the entire operation being automatically attended.

It will further be obvious that this automatic change-over can be predetermined for any particular time or showing so far as the unreeling of the film itself is concerned inasmuch as this can be adjusted to a considerable nicety by manipulation of the prisms 18 through the verniers 20 and associated gears.

I claim as my invention:

1. An automatic change-over apparatus for motion picture films, including a photo-electric cell mounted on the housing, means on the film for actuating the cell at a certain point in the unreeling of the film, and connections from the cell to adjacent projectors, the actuating means for the cell comprising radium paint on the film at a point close to the end of the reel whereby when this point is reached the adjacent projectors are set in operation.

2. An automatic change-over apparatus for motion picture films including a photo-electric cell, excitation means over an extended portion of the inner face of the film housing for actuating the cell, means on the housing for directing some particular point of excitation means on the inner face of the film housing to the photo-electric cell, and connections from the cell to adjacent projectors.

3. An automatic change-over apparatus for motion picture films, comprising a series of projectors having film housings, a photo-electric cell for each film housing positioned at some distance from the housing, excitation means over an extended portion of the inner faces of each film housing for actuating each cell, means on the housing for directing some particular point of the excitation means on the inner faces of the film housings to the photo-electric cells, said means being rotatable prisms, and connections from each cell to adjacent projectors.

4. An automatic change-over apparatus for motion picture films comprising a series of projectors having film housings, a photo-electric cell remotely positioned from each housing and connected with the film housing by an auxiliary housing, manually rotatable prisms in each auxiliary housing and a light passage-way through each film housing to each auxiliary housing, a coating over a portion of the inner face of each film housing having phosphorescent properties, light waves emitting from the coatings received by the prisms and they in turn focus these light waves on the photo-electric cells and connections from each cell to an adjacent projector.

5. An automatic change-over apparatus for motion picture films comprising a series of projectors having film housings, a photo-electric cell remotely positioned from each housing and connected with the film housing by an auxiliary housing, manually rotatable prisms in each auxiliary housing and a light passage-way through each film housing to each auxiliary housing, a coating over a portion of the inner face of each film housing having phosphorescent properties, light waves emitting from the coatings received by the prisms and they in turn focus these light waves on the photo-electric cells and connections from each cell to an adjacent projector, said connections including slow-acting relays and a potentiometer fader.

6. An automatic change-over apparatus for motion picture films comprising a series of projectors having film housings, a photo-electric cell remotely positioned from each housing and connected with the film housing by an auxiliary housing, manually rotatable prisms in each auxiliary housing and a light passage-way through each film housing to each auxiliary housing, a coating over a portion of the inner face of each film housing having phosphorescent properties, light waves emitting from the coatings received by the prisms and they in turn focus these light waves on the photo-electric cells and connections from each cell to an adjacent projector, said connections including slow-acting relays, the slow-acting relays including time delay mercury switches, and further automatic means for controlling the space and current for the arcs.

7. An automatic change-over apparatus for motion picture films, comprising a series of projectors having film housings, a photo-electric cell for each film housing positioned at some distance from the housing, radium paint over an extended portion of the inner faces of each film housing for actuating each cell, means on the housing for directing some particular point of the radium paint on the inner faces of the film housings to the photo-electric cells, said means being rotatable prisms, and connections from each cell to adjacent projectors.

8. An automatic change-over apparatus for motion picture films, including a photo-electric cell mounted on the housing, means on the film for actuating the cell at a certain point in the unreeling of the film, and connections from the cell to adjacent projectors, the actuating means for the cell comprising phosphorescent substance on the film at a point close to the end of the reel whereby when this point is reached the adjacent projectors are set in operation.

FREDERICK A. BERG.